United States Patent
Shintani

(10) Patent No.: US 11,183,147 B2
(45) Date of Patent: Nov. 23, 2021

(54) DEVICE AND METHOD FOR PROCESSING VIDEO CONTENT FOR DISPLAY CONTROL

(71) Applicant: SONY CORPORATION, Tokyo (JP)

(72) Inventor: Peter Shintani, San Diego, CA (US)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 381 days.

(21) Appl. No.: 15/288,450

(22) Filed: Oct. 7, 2016

(65) Prior Publication Data
US 2018/0102106 A1   Apr. 12, 2018

(51) Int. Cl.
| G09G 5/10 | (2006.01) |
| H04N 11/24 | (2006.01) |
| H04N 21/235 | (2011.01) |
| H04N 21/234 | (2011.01) |
| H04N 21/84 | (2011.01) |

(Continued)

(52) U.S. Cl.
CPC .............. *G09G 5/10* (2013.01); *H04N 11/24* (2019.01); *H04N 21/235* (2013.01); *H04N 21/23418* (2013.01); *H04N 21/23424* (2013.01); *H04N 21/42607* (2013.01); *H04N 21/435* (2013.01); *H04N 21/44008* (2013.01); *H04N 21/44016* (2013.01); *H04N 21/812* (2013.01); *H04N 21/84* (2013.01); *H04N 21/8456* (2013.01); *G09G 2320/066* (2013.01); *G09G 2320/0613* (2013.01); *G09G 2340/14* (2013.01); *G09G 2370/04* (2013.01)

(58) Field of Classification Search
None
See application file for complete search history.

(56) References Cited

U.S. PATENT DOCUMENTS

2005/0289583 A1* 12/2005 Chiu ................ H04H 60/375
725/22
2008/0100743 A1   5/2008 Cho et al.
(Continued)

FOREIGN PATENT DOCUMENTS

| CN | 101021625 A | 8/2007 |
| CN | 101170708 A | 4/2008 |

(Continued)

OTHER PUBLICATIONS

Extended European Search Report of EP Application No. 17194885.4, dated Nov. 24, 2017, 10 pages of EESR.

(Continued)

*Primary Examiner* — Andre L Matthews
(74) *Attorney, Agent, or Firm* — Chip Law Group

(57) ABSTRACT

Various aspects of a video processing device and method for display control includes detection, from a sequence of image frames received from a video source, a transition from one or more frames associated with a first metadata to one or more other frames associated with a second metadata. First visual properties of the one or more frames are determined based on the first metadata. Second visual properties of the one or more other frames are determined based on the second metadata. The determined second visual properties of the one or more other frames are controlled in accordance with the determined first visual properties of the one or more frames to enable a smooth transition.

14 Claims, 5 Drawing Sheets

(51) Int. Cl.
*H04N 21/435* (2011.01)
*H04N 21/845* (2011.01)
*H04N 21/44* (2011.01)
*H04N 21/426* (2011.01)
*H04N 21/81* (2011.01)

(56) References Cited

U.S. PATENT DOCUMENTS

| | | | |
|---|---|---|---|
| 2009/0002564 A1* | 1/2009 | Barnhoefer | G09G 3/3406 348/687 |
| 2009/0150230 A1 | 6/2009 | Verhaegh et al. | |
| 2014/0044372 A1 | 2/2014 | Mertens | |
| 2015/0256860 A1 | 9/2015 | Kunkel et al. | |
| 2016/0005201 A1 | 1/2016 | Kunkel et al. | |
| 2016/0037232 A1* | 2/2016 | Hu | H04N 21/812 725/34 |
| 2016/0050353 A1 | 2/2016 | Atkins | |
| 2016/0080716 A1 | 3/2016 | Atkins et al. | |
| 2016/0210730 A1 | 7/2016 | Eto et al. | |
| 2016/0249009 A1 | 8/2016 | Messmer | |
| 2017/0221413 A1* | 8/2017 | Hoffman | G09G 3/3208 |
| 2018/0070083 A1 | 3/2018 | Tsukagoshi | |
| 2018/0144693 A1* | 5/2018 | Saito | G06F 3/1423 |
| 2018/0338104 A1* | 11/2018 | Pines | G09G 5/00 |

FOREIGN PATENT DOCUMENTS

| | | |
|---|---|---|
| CN | 105744118 A | 7/2016 |
| CN | 106657714 A | 5/2017 |
| JP | 2014-534719 A | 12/2014 |
| JP | 2016-034125 A | 3/2016 |
| JP | 2016-515327 A | 5/2016 |
| JP | 2016-149802 A | 8/2016 |
| WO | 2009/157903 A1 | 12/2009 |
| WO | 2013/059116 A1 | 4/2013 |
| WO | 2015/007910 A | 1/2015 |
| WO | 2016/129891 A1 | 8/2016 |
| WO | 2016/152684 A1 | 9/2016 |

OTHER PUBLICATIONS

Office Action for JP Patent Application No. 2017-194933, dated Jun. 27, 2018, 04 pages of Office Action and 03 pages of English Translation.

Office Action for JP Patent Application No. 2017-194933, dated Feb. 6, 2019, 03 pages of Office Action and 04 pages of English Translation.

Office Action for CN Patent Application No. 201710902186.3, dated Sep. 26, 2019, 09 pages of Office Action and 10 pages of English Translation.

Office Action for EP Patent Application No. 17194885.4, dated Jun. 10, 2020, 8 pages.

Office Action for CN Patent Application No. 201710902186.3, dated Apr. 20, 2020, 08 pages of Office Action and 07 pages of English Translation.

* cited by examiner

DEVICE AND METHOD FOR PROCESSING VIDEO CONTENT FOR DISPLAY CONTROL

CROSS-REFERENCE TO RELATED APPLICATIONS/INCORPORATION BY REFERENCE

None.

FIELD

Various embodiments of the disclosure relate to video processing. More specifically, various embodiments of the disclosure relate to a device and method to process video content for display control.

BACKGROUND

Advancements in the field of video content processing and display technologies have extended the functionalities of various consumer electronic (CE) devices, such as a television (TV) or a set-top box (STB). For instance, high definition TV (HDTV) market has been changing by leaps and bounds in terms of technology and product offerings. Current popular video formats including TV broadcast, are limited by standards. Emerging and next generation video programming, such as high dynamic range (HDR) video, may be adopted widely for broadcast over the air or via a multichannel video programming distributor (MVPD). A high dynamic range (HDR) provides more information about brightness and color across a much wider range than existing video formats. Thus, HDR video content on HDR-compatible HDTVs may provide wider range of brightness and darkness with greater picture detail. Typically, a video programming broadcast, such as a TV program, may include various interstitial content items, such as advertisements. The video format of such interstitial content items may be same as the format of the TV program or may be different. Further, the visual appearance of the interstitial content items may not be in sync or may not relate to the main video content, such as the TV program. For certain video formats, such as the HDR or standard dynamic range (SDR), the change from main video content to the interstitial content items may be more apparent and may not be visually pleasing to a viewer. Therefore, an improved technology and system may be required to moderate visual appearance of interstitial content items and/or the main video content as per a viewer's or a broadcaster's choice to provide an enhanced viewing experience.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A device and method for video content processing for display control, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed device and method for processing of video content for display control. Exemplary aspects of the disclosure may comprise a method that may include detecting, from a sequence of image frames received from a video source, a transition from one or more frames associated with a first metadata to one or more other frames associated with a second metadata. First visual properties of the one or more frames may be determined based on the first metadata. Second visual properties of the one or more other frames may be determined based on the second metadata. The determined second visual properties of the one or more other frames may be controlled in accordance with the determined first visual properties of the one or more frames to enable a smooth transition.

In accordance with an embodiment, the sequence of image frames may comprise a first type of video segment and a second type of video segment. The first type of video segment may correspond to the one or more frames and the second type of video segment may correspond to the one or more other frames. The first type of video segment and the second type of video segment may be a high dynamic range (HDR) video. The first type of video segment may correspond to a television program, a video item from an Internet-based video streaming application, and/or a video item from a pre-subscribed service. The second type of video segment may correspond to an interstitial content, a commercial, a trailer, and/or a segment of video content serving as an attraction for viewership.

In accordance with an embodiment, the first visual properties and the second visual properties may correspond to brightness properties. The first metadata and the second metadata may comprise at least one of average picture brightness information, a maximum picture brightness information, and/or chroma information.

In accordance with an embodiment, a flag value may be detected in the sequence of image frames received from the video source for the detection of the transition. The flag value may represent a discontinuity between the one or more frames and the one or more other frames in the sequence of image frames. The detected flag value and spatial image information may be utilized for the determination of the first visual properties and the second visual properties.

In accordance with an embodiment, the control of the determined second visual properties of the one or more other frames may be dynamically terminated in an event that a difference in the determined second visual properties between two successive image frames of the one or more other frames is less than a specified threshold value.

Figure 1:
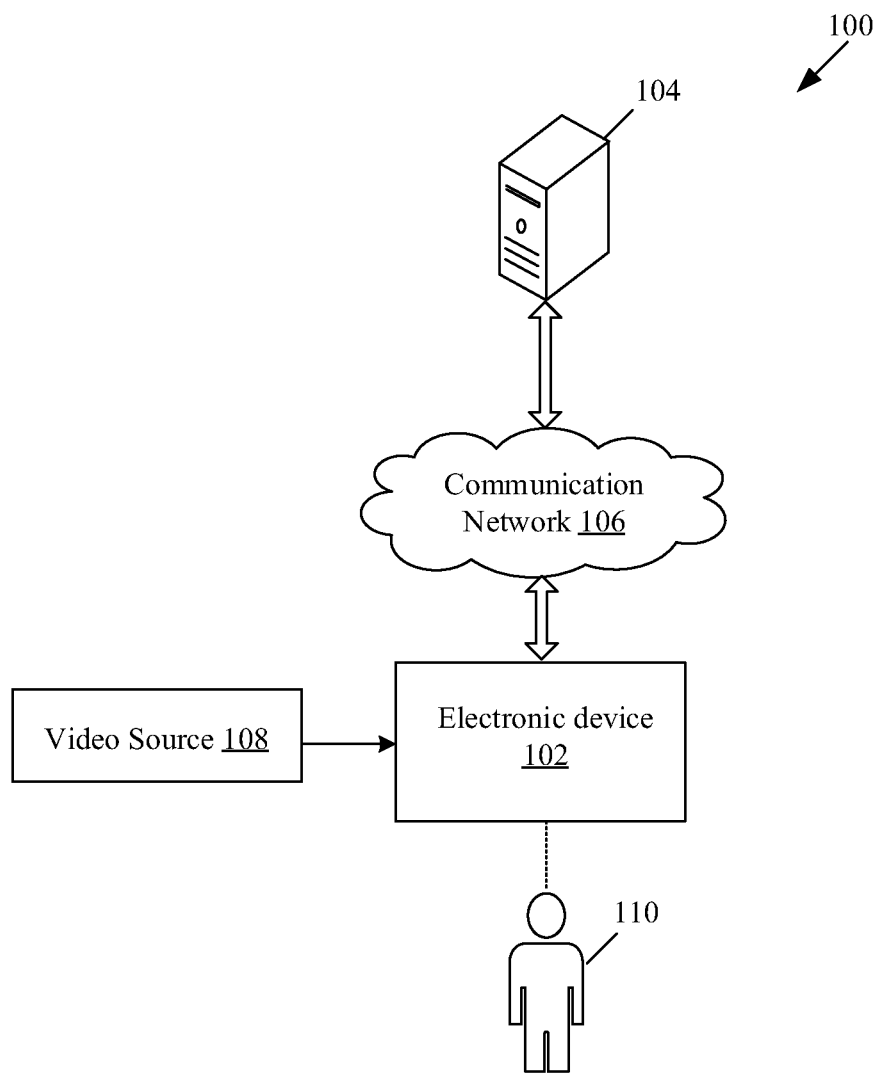
FIG. 1 is a block diagram that illustrates a network environment, in accordance with an embodiment of the disclosure.

FIG. 1 is a block diagram that illustrates a network environment, in accordance with an embodiment of the disclosure. With reference to FIG. 1, there is shown a network environment 100. The network environment 100 may include an electronic device 102, one or more servers, such as the server 104, a communication network 106, a video source 108, and one or more users, such as a user 110. The user 110 may be associated with the electronic device 102. In accordance with an embodiment, the electronic device 102 may be communicatively coupled to the server 104, via the communication network 106. The electronic device 102 may further be communicatively coupled with the video source 108.

The electronic device 102 may comprise suitable logic, circuitry, interfaces, and/or code that may be configured to access one or more video content items from the server 104 or from the video source 108. Examples of the electronic device 102 may include, but are not limited to, a TV, such as a HDR-compatible HDTV, a digital TV, a smart TV, an Internet Protocol television (IPTV), a three-dimensional (3D) TV, a set-top box, a tablet computer, a smartphone, a display device, and/or other electronic devices.

The server 104 may comprise suitable logic, circuitry, interfaces, and/or code that may be configured to transmit a plurality of video content items, such as TV video programming, to the electronic device 102. The server 104 may be configured to broadcast the plurality of video content items to the electronic device 102, via the communication network 106. The server 104 may be implemented by use of several technologies that are well known to those skilled in the art. Examples of the server 104 may include, but are not limited to, at least one of a media streaming server, a cloud server, a broadcast server, an application server, a database server, a web server, a file server, and/or any combination thereof.

The communication network 106 may include a communication medium through which the electronic device 102 may communicate with one or more servers, such as the server 104. Examples of the communication network 106 may include, but are not limited to, at least one of the Internet, a cloud network, a Wireless Fidelity (Wi-Fi) network, a Wireless Local Area Network (WLAN), a wireless personal area network (WPAN), a wireless wide area network (WWAN), a Local Area Network (LAN), a plain old telephone service (POTS), a Metropolitan Area Network (MAN), a multicast network, and/or a broadcast network, such as a television broadcast. Various devices in the network environment 100 may be configured to connect to the communication network 106, in accordance with various wired, wireless, and/or broadcast communication protocols. Examples of such wired and wireless communication protocols may include, but are not limited to, at least one of Transmission Control Protocol and Internet Protocol (TCP/IP), Long Term Evolution (LTE), User Datagram Protocol (UDP), Hypertext Transfer Protocol (HTTP), File Transfer Protocol (FTP), ZigBee, EDGE, infrared (IR), IEEE 802.11, 802.16, cellular communication protocols, cable network, unencrypted satellite (free-to-air), direct broadcast satellite television, Internet protocol television (IPTV), other broadcast (over-the-air) communication protocols, video streaming protocols, Bluetooth (BT) communication protocols, and/or variants thereof.

The video source 108 may include an integrated or an external set-top box connected to the electronic device 102. The integrated or an external set-top box may be communicatively coupled to a satellite dish (not shown), to receive TV signals and/or other subscription services, such as online movie streaming services. The video source 108 may correspond to a multichannel video programming distributor (MVPD) service. The video source 108 may further include one or more inbuilt or external storage devices, such as an external storage device, connected to the electronic device 102, which may enable access to the video content items at the electronic device 102. The video source 108 may further include a high bandwidth medium such as a coaxial cable and/or an optical fiber cable, to access TV programs, or other content including video content items from the Internet.

In operation, the electronic device 102 may be configured to receive a plurality of video content items from an incoming video source, such as the video source 108 or the server 104. The plurality of video content items may correspond to multiple videos, where each video includes different types of video segments. For instance, each of the plurality of video content items may comprise a first type of video segment and a second type of video segment. Examples of the first type of video segment may include, but are not limited to, at least one of a TV program, a video item from an Internet-based video streaming application, and/or a video item from a pre-subscribed service. The second type of video segment may be a short video program interspersed between first type of video segments. For example, the second type of video segment may refer to a short video advertisement which may be interspersed in a main video content item, such as the TV program. Here, the TV program may correspond to the first type of video segment. Other examples of the second type of video segment may include, but are not limited to, at least one of a commercial, a trailer, and a segment of video content serving as an attraction for viewership. The second type of video segment may also be referred to as interstitial content, an interstitial program, a wraparound program, or a wraparound segment. Such interstitial content, such as one or more TV commercials, are usually interspersed in TV video programming, such as TV shows, TV programs, and/or TV channels. The plurality of video content items may further correspond to video items received from one or more Internet-based video streaming applications, and/or video items from a pre-subscribed service, such as a pre-subscribed satellite-based movie-streaming service, which also include such interstitial content.

The electronic device 102 may be configured to process a video content item from the received plurality of video content items. The video content item may comprise the first type of video segment and the second type of video segment. In accordance with an embodiment, the electronic device 102 may be configured to detect a flag value in the video content item. The flag value may represent a discontinuity between the first type of video segment, such as a TV program, and the second type of video segment, such as a TV advertisement. In certain scenarios, the first and the second type of video segments may be a HDR video. Usually, a HDR video may be broadcast with metadata which indicates video characteristics including visual properties of the HDR video. The electronic device 102 may be configured to detect from a sequence of image frames of the processed video content item, a transition from one or more first frames associated with a first metadata to one or more second frames associated with a second metadata. The one or more first frames associated with the first metadata may correspond to the first type of video segment, such as the TV program. The one or more second frames associated with the second metadata may correspond to the second type of video segment, such as the TV advertisement. The first metadata and the second metadata may, for example, comprise average picture brightness information, a maximum picture brightness information, and/or chroma information. Average picture brightness is usually calculated from brightness of each pixel of an image frame, and is represented by a range, such as 0 (completely black) to 255 (completely white) range in existing video formats. HDR provides more information about brightness, and color across a much wider range than existing video formats. For example, for illustrative purposes, in HDR video the variation may range from 0.0004 darkness level to more than 1000 nits peak brightness level. The average picture brightness information for the processed video content item may include these average picture brightness values on frame-by-frame or scene-by-scene basis. The maximum picture brightness information may correspond to the peak brightness level. In TV, a signal level that corresponds to the maximum picture brightness may also be referred to as a white level. Similar to the brightness range, in case of a HDR video, the chroma information may correspond to a color range whose RGB channel values may not be limited by the "0 . . . 1" or "0 . . . 255" range. The RGB channel values may be unlimited or within a specified range, such as ranging from fractions to trillions, positive or negative.

In accordance with an embodiment, a transition point may be detected based on the detected flag value. The detected flag value(s) may also be referred to as discontinuity flag(s). The transition point may refer to a time instant or a physical position of one or more frames in the processed video content item, where one of the first type video segments end and at least one of the second type of the video segment starts. In other words, the transition point may refer to a time instant or a frame from where at least one of the second type of video segments starts or ends. For example, the transition point may be a time instant or a frame just before the start of advertisement in the TV program.

In accordance with an embodiment, the electronic device 102 may be configured to determine first visual properties of the one or more frames based on the first metadata. The electronic device 102 may further be configured to determine second visual properties based on the second metadata. The visual properties may correspond to the brightness properties. The electronic device 102 may further be configured to control the determined second visual properties of one or more other frames in accordance with the determined first visual properties of the one or more frames to enable a smooth transition. For example, the brightness properties of the second type of video segment, such as the TV advertisement may be controlled in accordance with the brightness properties of the first type of video segment, such as the TV program. The brightness properties may include the average picture brightness values, the maximum picture brightness value(s), and/or an overall brightness level values of each frame or each scene of the second type of video segment.

Figure 2:
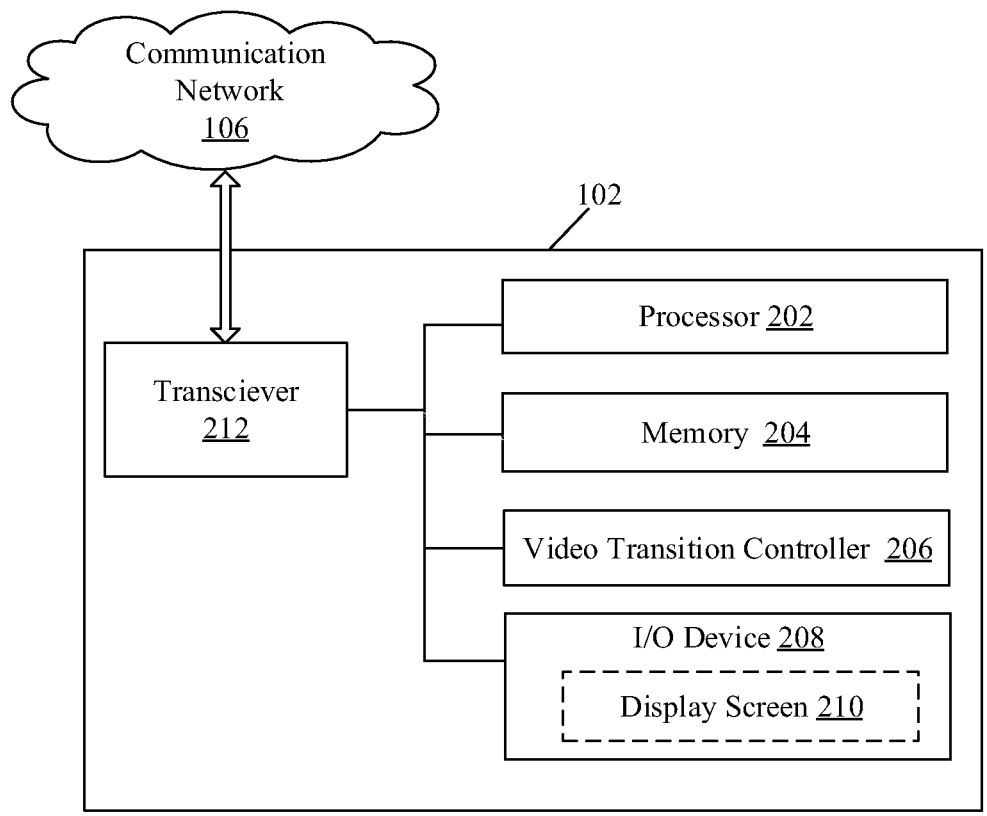
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may include one or more processors, such as a processor 202. The electronic device 102 may further include a memory 204, a video transition controller 206, and one or more input/output (I/O) devices, such as an I/O device 208. There is further shown a display screen 210 in the I/O device 208 and a transceiver 212, and the communication network 106 (FIG. 1). In accordance with an embodiment, the I/O device 208 may be an inbuilt unit or an external unit coupled to the electronic device 102.

In accordance with an embodiment, the processor 202 may be communicatively coupled to the memory 204, the video transition controller 206, the I/O device 208, and the transceiver 212. The transceiver 212 may be configured to communicate with one or more servers, such as the server 104, via the communication network 106. The transceiver 212 may further be configured to communicate with video source 108.

The processor 202 may comprise suitable logic, circuitry, interfaces, and/or code that may be configured to execute a set of instructions stored in the memory 204. The processor 202 may be configured to receive a plurality of video content items from the video source 108, via the transceiver 212. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 204 may comprise suitable logic, circuitry, and/or interfaces that may be configured to store a set of instructions executable by the processor 202. In accordance with an embodiment, the memory 204 may be configured to store the received plurality of video content items. Examples of types of the memory 204 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), and/or a Secure Digital (SD) card, and/or cache memory.

The video transition controller 206 may comprise suitable logic, circuitry, interfaces, and/or code that may be configured to detect a transition from one or more frames associated with a first metadata to one or more other frames associated with a second metadata. The video transition controller 206 may be further configured to control visual properties, such as picture brightness properties, of the one or more other frames, such as a commercial or an advertisement video segment. The video transition controller 206 may be implemented as a separate processor, such as a graphics processing unit (GPU), or specialized circuitry in the electronic device 102. The video transition controller 206 and the processor 202 may be implemented as an integrated processor or a cluster of processors that perform the functions of the video transition controller 206 and the processor 202. The video transition controller 206 may be implemented as a set of instructions stored in the memory 204, which on execution by the processor 202 may perform the functions of the electronic device 102.

The I/O device 208 may comprise suitable logic, circuitry, interfaces, and/or code that may be configured to receive an input from a user, such as the user 110. The I/O device 208 may be further configured to provide an output to the user 110. The I/O device 208 may comprise various input and output devices that may be configured to communicate with the processor 202. Examples of the input devices may include, but are not limited to, a touch screen, a joystick, a microphone, a motion sensor, a light sensor, and/or a docking station. Examples of the output devices may include, but are not limited to, the display screen 210, a projector screen, and/or a speaker.

The transceiver 212 may comprise suitable logic, circuitry, interfaces, and/or code that may be configured to communicate with one or more servers, such as the server 104, via the communication network 106 (as shown in FIG. 1). The transceiver 212 may be configured to communicate with the video source 108. The transceiver 212 may comprise one or more transmitters, and/or one or more receivers, which may be integrated or separate, and may be configured to implement known technologies to support wired or wireless communication of the electronic device 102 with the communication network 106. The transceiver 212 may include, but is not limited to, an antenna, one or more radio frequency (RF) transmitters and/or receivers, one or more amplifiers, a tuner, one or more oscillators, a digital signal processor, a coder-decoder (CODEC) chipset, a subscriber identity module (SIM) card, and/or a local buffer.

In operation, the processor 202 may be configured to receive a plurality of video content items from the video source 108, by use of the transceiver 212. The processor 202 may be configured to process at least a video content item from the received plurality of video content items. For example, the user 110 may watch a certain TV channel on the display screen 210. The received video content item, such as a video programming of the TV channel, may be displayed on the display screen 210.

In accordance with an embodiment, the video transition controller 206 may be configured to detect one or more flag values in the video content item that is under processing before actual content is displayed on the display screen 210. For example, one or more flag values may be discontinuity flags. Such discontinuity flags may represent a discontinuity between the first type of video segment, such as a TV show of the TV channel currently displayed on the display screen 210, and an upcoming second type of video segment, such as a TV advertisement. In certain scenarios, the first and the second type of video segments may be a HDR video. Usually, a HDR video may be broadcast along with metadata which indicates video characteristics including visual properties of the HDR video. In such scenarios, the video transition controller 206 may be configured to detect from a sequence of image frames of the processed video content item, a transition from one or more frames associated with a first metadata to one or more other frames associated with a second metadata. For example, the video transition controller 206 may be configured to detect a transition from one or more frames of the TV show of the TV channel currently displayed on the display screen 210 to one or more other frames of the TV advertisement. In accordance with an exemplary embodiment, one or more blank or black colored frame inserted within the video content item may indicate a transition point.

In accordance with an embodiment, discontinuity flag information may be present in the compressed video stream of a video programming broadcast. The discontinuity flag information may indicate a discontinuity, such as a discontinuity between a TV program and various interstitial content items, such as advertisements. This discontinuity flag information may be leveraged to detect the transition point, for example the transition point between the TV program video and various interstitial video in the received compressed video stream. In another example, in certain scenarios, a fade-to-black change or insertion of one or more frames of an intermediate brightness level may also indicate a discontinuity. This change may also be used for detection of a discontinuity. Further, in some broadcast systems and/or video streaming services, there may be multiple combinations of a transition since there may be multiple HDR schemes, such as Technicolor Prime, Perceptual Quantizer (PQ) format, Hybrid Log-Gamma (HLG), and the like. So discontinuities could be transition between standard dynamic range (SDR)-HLG or HLG-PQ or HLG- to Prime, and so on. Similarly, HDR to HDR discontinuities may also be detected based on various identifiers, flags, or a cue that indicates the transition point, as described above.

In accordance with an embodiment, the first metadata and the second metadata may comprise average picture brightness information, maximum picture brightness information, chroma information, and/or Electro-Optical Transfer Function (EOTF) that defines a digital video signal, for example, Perceptual Quantizer (PQ) US H6G, or PQ EOTF. In accordance with an embodiment, after the detection of the flag value, the video transition controller 206 may be configured to determine the first visual properties of the one or more frames based on the first metadata. The video transition controller 206 may be configured to determine the second visual properties based on the second metadata. The visual properties may correspond to the brightness properties. The video transition controller 206 may be configured to control the determined second visual properties of one or more other frames in accordance with the determined first visual properties of the one or more frames to enable a smooth transition.

In accordance with an embodiment, the video transition controller 206 may be configured to control the determined first visual properties of the one or more frames in accordance with the determined second visual properties of one or more other frames to enable a smooth transition. For example, a dynamic range of brightness of a specified number of frames of the TV show, preceding just before the advertisement may be moderated to enable a smooth transition to the dynamic range of brightness of the advertisement. Alternatively, to provide more visual impact to the advertisement, the dynamic range of brightness of the advertisement may be automatically adjusted in relation to dynamic range of brightness of the TV show, to make the advertisement appear more vivid and brighter as per specified preferences stored in the memory 204. The specified preferences may be user-defined, configurable, or default preferences configured in the electronic device 102.

For example, in a first specified configuration, the average picture brightness values of the specified number of frames of the TV show, preceding just before the advertisement may be gradually moderated to be similar to the average picture brightness values of the advertisement to enable a smooth transition. In a second specified configuration, the average picture brightness values of a specified number of frames of the advertisement, succeeding just after the last image frame of the TV show may be gradually moderated to be similar to the average picture brightness values of the last few frames of the TV show to enable a smooth transition. In a third specified configuration, the average picture brightness values of a specified number of frames of the advertisement, succeeding just after the last image frame of the TV show may be gradually increased than the average picture brightness values of the last few frames of the TV show to make the advertisement appear more vivid and brighter than original advertisement.

In certain other scenarios, the first and/or the second type of video segments may not be a HDR video. Accordingly, metadata which indicates video characteristics including visual properties of the HRD video may not be present.

Further, in certain instances metadata may be absent in a HRD video. In such scenarios, the one or more frames and one or more other frames may not be associated with metadata. The video transition controller 206 may then be configured to determine the first visual properties of one or more frames based on spatial image information of the one or more frames. Similarly, the video transition controller 206 may be configured to determine the second visual properties of one or more other frames by determining the spatial image information of the one or more other frames. The video transition controller 206 may be configured to control the determined second visual properties of one or more other frames in accordance with the determined first visual properties of the one or more frames to enable a smooth transition. Further, in certain cases, the first type of video segment and/or the second type of video segment may not be a hybrid log-gamma (HLG) video, which may not require metadata. In such cases, based on the detection of flag value, such as the discontinuity flags, the transition may be detected, followed by a manual offset of the average brightness for the second type of video segment. The manual offset may refer to setting of the same or similar average picture brightness values to be used by the video transition controller 206 to display all the second type of video segments in the set average picture brightness values irrespective of the average picture brightness values of the first type of video segments. Alternatively, instead of manual offset, a user-defined or pre-specified offset of the average picture brightness may be performed by the video transition controller 206 based on, for example, content analysis of the second type of the video segment.

In accordance with an embodiment, the video transition controller 206 may be configured to dynamically terminate the control of the determined second visual properties of the one or more other frames in an event that a difference in the determined second visual properties between two successive image frames of the one or more other frames is less than a specified threshold value. For example, after controlling the brightness of certain number of frames of the advertisement, there may not be sharp or sudden increase or decrease in the brightness level of succeeding frames of the advertisement. Thus, it may not be required to further control the brightness level of succeeding frames of the advertisement.

Figure 3:
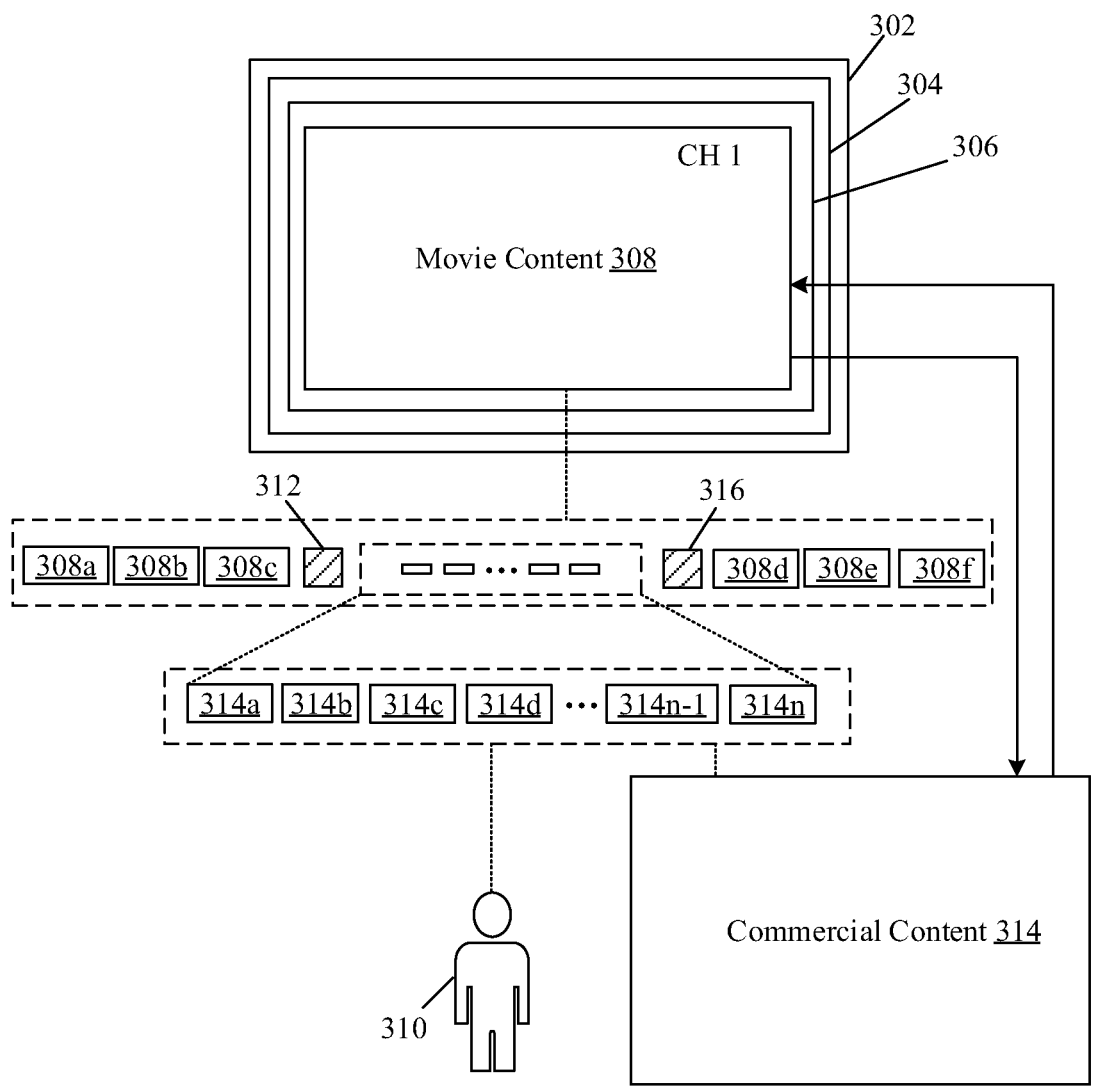
FIG. 3 illustrates an exemplary scenario for implementation of the disclosed device and method for video content processing for display control, in accordance with an embodiment of the disclosure.

FIG. 3 illustrates an exemplary scenario for implementation of the disclosed device and method for video content processing for display control, in accordance with an embodiment of the disclosure. FIG. 3 is explained in conjunction with elements from FIG. 1 and FIG. 2. With reference to FIG. 3, there is shown a TV 302, a TV display 304, a user interface (UI) 306, a movie content 308, and a user 310. The movie content 308 may include a plurality of interstitial content items, such as a commercial content 314. FIG. 3 further shows a plurality of frames 308a to 308f of the movie content 308. Similarly, the commercial content 314 may include a plurality of frames 314a to 314n that may be located between the frame 308c and the frame 308d of the movie content 308, as shown. Discontinuity flags 312 and 316 are also shown in FIG. 3.

In accordance with the exemplary scenario, the TV 302 may correspond to the electronic device 102. The TV display 304 may correspond to the display screen 210. The movie content 308 in the user interface 306 may correspond to a video content item received from the video source 108. The user 310 may watch the movie content 308 on the TV 302. Each frame of the movie content 308 and the commercial content 314 may have respective metadata. The metadata of a frame may represent the visual properties of the frame such as average picture brightness, and/or peak picture brightness.

In accordance with an embodiment, the video transition controller 206 may be configured to determine a different type of video segment, such as the commercial content 314, based on a detection of the discontinuity flags 312 and 316. For example, the discontinuity flag 312 may indicate a discontinuity between the movie content 308 and the commercial content 314. After detecting the discontinuity flag 312, the video transition controller 206 may be configured to determine the first visual properties of a specified number of frames, such as the frames 308a to 308c, which precedes the commercial content 314. For instance, based on the metadata associated with frame 308c, the video transition controller 206 may determine first visual properties of the frame 308c. Similarly, the video transition controller 206 may be configured to determine the second visual properties of a specified number of frames, such as the frames 314a to 314d, which succeeds the frame 308c of the movie content 308. For instance, based on the metadata associated with each of the frames 314a to 314n, the second visual properties may be determined.

The video transition controller 206 may be configured to control the visual properties of the specified or determined number of frames, such as frames 314a to 314d of the commercial content 314. In accordance with an embodiment, the control may be performed in accordance with the determined first visual properties of the frame 308c of the movie content 308 to enable a smooth transition from the brightness range of the frames 308a to 308c of the movie content 308 to a moderated brightness range of the frames 314a to 314d of the commercial content 314. In accordance with an embodiment, the video transition controller 206 may be configured to dynamically terminate the control operation after the frame 314d. Such termination may occur in an event that a difference in the determined second visual properties between two successive frames, such as the frame 314c and the frame 314d, of the commercial content 314 is less than a threshold value. The processor 202 may be configured to display the controlled second visual properties of each of the frames 314a to 314d of the commercial content 314 on the TV display 304. Thus, the TV 302 may provide an enhanced viewing experience to the user 310 who may experience a smooth transition between the movie content 308 and the commercial content 314 without a sudden visually-perceptible change in brightness or darkness during the transition. Alternatively, in accordance with an embodiment, based on specified instructions embedded in the metadata, the dynamic range of brightness of a certain portion of the commercial content 314 may be increased to transform the portion of the commercial content 314 to appear more visually impactful and appealing to the user 310. For example, the average picture brightness of a certain portion of the commercial content 314 may the increased by a specified or determined percentage value, for example, 5%, 10% or 20% (as per the specified instructions), than the original picture brightness portion of the commercial content 314.

Figure 4A:
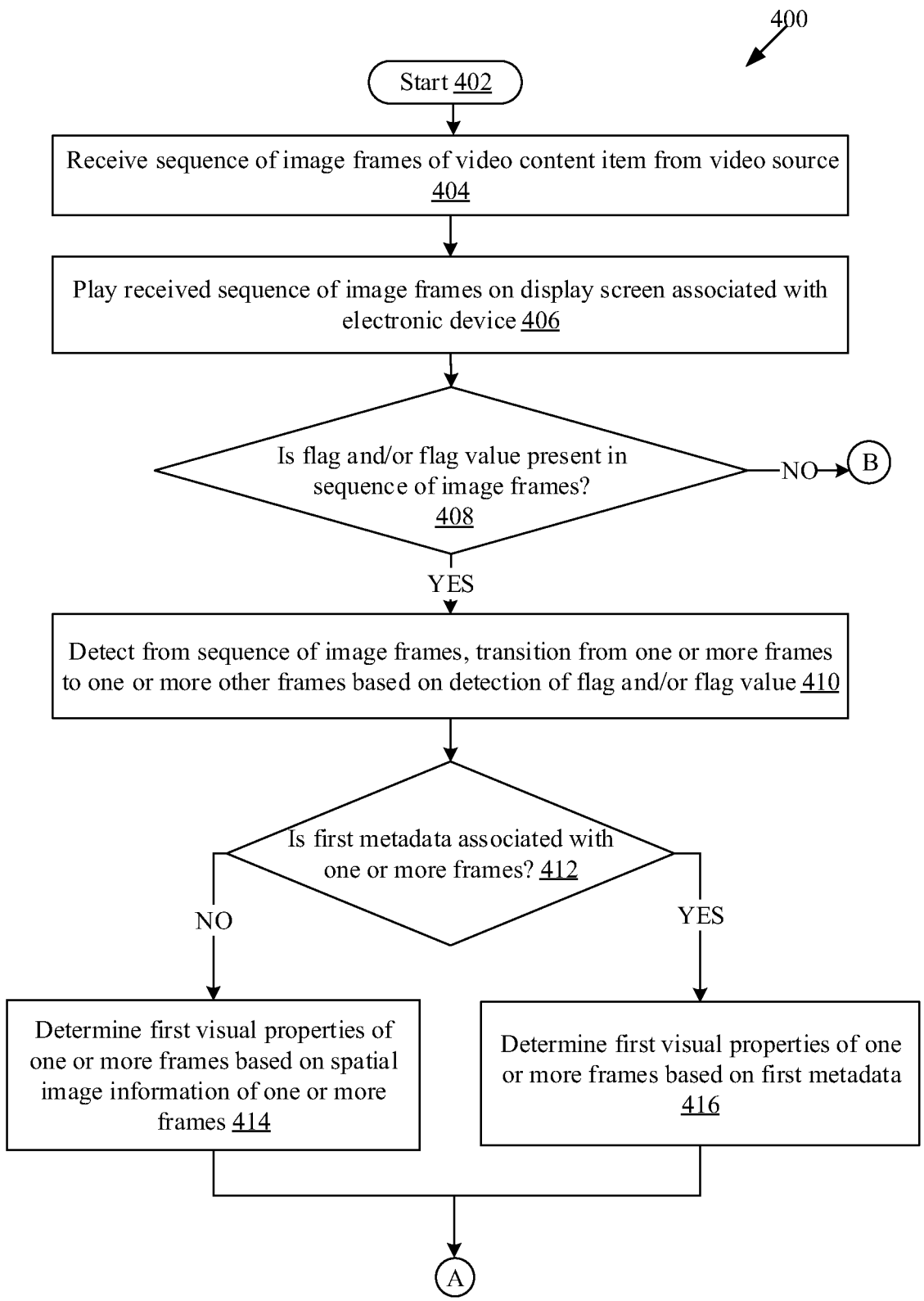
FIGS. 4A and 4B, collectively, depict a flowchart that illustrates an exemplary method for video content processing for display control, in accordance with an embodiment of the disclosure.

FIG. 4 depicts a flowchart that illustrates an exemplary method for video content processing for display control, in accordance with an embodiment of the disclosure. With reference to FIG. 4, there is shown a flow chart 400. The flow chart 400 is described in conjunction with FIGS. 1, 2, and 3. The method starts at 402 and proceeds to 404.

At 404, a sequence of image frames of a video content item may be received from the video source 108. An example of a video content item, such as the movie content 308 that may be a HDR content, is shown and described in FIG. 3. At 406, the received sequence of image frames may be played on the display screen 210 associated with the electronic device 102. An example of the sequence of image frames, such as the frames 308a to 308f and 314a to 314n, is shown in the FIG. 3.

Figure 4B:
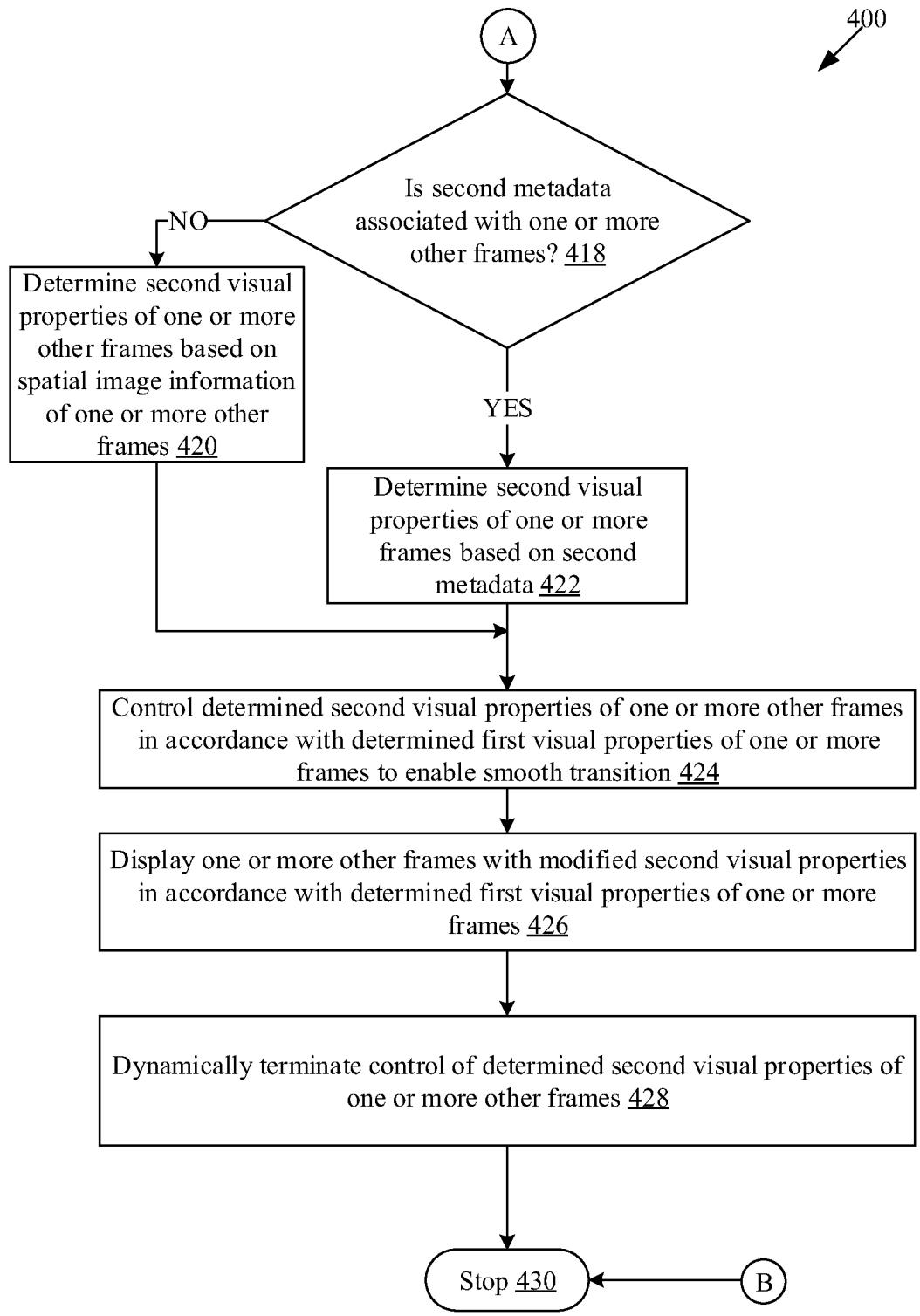

At 408, it may be determined whether a flag, such as a discontinuity flag and/or a flag value, is present in the received sequence of image frames of the video content item. In an event that the flag value is not present, the control may pass to 430 (FIG. 4B). In an event that the flag and/or the flag value is present, the control may pass to 410, shown. An example of the flag value, such as the discontinuity flags 312 and 316, is shown and described in the FIG. 3.

At 410, a transition from one or more frames to one or more other frames may be detected based on the detected flag and/or the detected flag value. The one or more frames may correspond to the first type of video segment, such as the TV program. An example of the first type of video segment, such as the movie content 308, is shown in the FIG. 3. The one or more other frames may correspond to the second type of video segment, such as a TV advertisement. An example of the second type of video segment, such as the commercial content 314, is shown and described in the FIG. 3.

At 412, it may be determined whether a first metadata is associated with the one or more frames. In an event that the first metadata is not present, the control may pass to 414. In an event that the first metadata is present, the control may pass to 416. At 414, the video transition controller 206 may be configured to determine the first visual properties of the one or more frames based on spatial image information of the one or more frames. At 416, the video transition controller 206 may be configured to determine the first visual properties of the one or more frames based on the first metadata associated with each of the one or more frames. For example, the video transition controller 206 may be configured to determine the brightness properties of the frame 308c based on the metadata associated with the frame 308c, as shown and described in the FIG. 3.

At 418, it may be determined whether a second metadata is associated with one or more other frames. In an event that the second metadata is not present, the control may pass to 420. In in an event that the second metadata is present, the control may pass to 422. At 420, the video transition controller 206 may be configured to determine the second visual properties of the one or more other frames based on spatial image information of one or more other frames. At 422, the video transition controller 206 may be configured to determine second visual properties of the one or more other frames, such as the frames 314a to 314d (shown in FIG. 3), based on the second metadata associated with each of the frames 314a to 314d.

At 424, the determined second visual properties of the one or more other frames, such as the frames 314a to 314d, may be controlled. The control may occur in accordance with the determined first visual properties of the one or more frames, such as the frame 308c, to enable a smooth transition. At 426, the one or more other frames may be displayed in accordance with second visual properties of one or more other frames on the display screen 210 associated with electronic device 102. The one or more other frames may be displayed with modified second visual properties such that the visual properties are similar to that of the determined first visual properties. A smooth transition from one or more frames, such as the frame 308c, to one or more other frames, such as the frames 314a to 314n, may be visualized and experienced while viewing the video content item.

At 428, the control of determined second visual properties of the one or more other frames may be dynamically terminated. The termination may occur in an event that a difference in determined second visual properties between two successive image frames of one or more other frames is less than a threshold value. The control may pass to 430.

In accordance with an embodiment of the disclosure, a video processing device for display control is disclosed. The device (such as the electronic device 102 (FIG. 1) may comprise one or more circuits (such as the processor 202, the video transition controller 206, the transceiver 212, and/or other components of FIG. 2). The video transition controller 206 may be configured to detect from a sequence of image frames received from the video source 108, a transition from one or more frames associated with a first metadata to one or more other frames associated with a second metadata. The video transition controller 206 may be configured to determine first visual properties of the one or more frames based on the first metadata. The video transition controller 206 may be configured to determine second visual properties of the one or more other frames based on the second metadata. The video transition controller 206 may be configured to control the determined second visual properties of the one or more other frames in accordance with the determined first visual properties of the one or more frames to enable a smooth transition.

Traditional approaches of display control may not be suitable for a smooth transition between different image frames of a HDR video content item. As HDR video content played on HDR-compatible HDTVs may provide wider range of brightness and darkness with greater picture detail, the change from main video content, such as the TV program, to the interstitial content items, such as the commercial content 314, may be more apparent and may not be visually pleasing to a viewer. Further, the difficulty to quickly control the visual appearance of the interstitial content items that may not be in sync or may not relate to the main video content, may increase for certain video formats, such as the HDR or HLG. Thus, the video transition controller 206 is provided to detect, from the sequence of image frames received from the video source 108, a transition from one or more frames (such as one or more frames of a TV program) associated with the first metadata to one or more other frames (such as one or more frames of an advertisement) associated with the second metadata. Such detection and analysis of the metadata and any discontinuity flags in a video stream, by the video transition controller 206 may detect in advance whether the dynamic range of brightness or darkness for an advertisement may be adjusted before the advertisement is actually played on the electronic device 102, such as a TV. The video transition controller 206 may be configured to control the visual properties of a specified number of frames of the advertisement in an efficient manner in accordance with the visual properties of one or more frames of the main HDR or HLG content, such as the one or more frames of the TV program. The control of the visual properties by the video transition controller 206 of the electronic device 102 based on the detection of the transition, improves the functioning of the electronic device 102, such as a TV, itself to provide an enhanced viewing experience. The video transition controller 206 of the electronic device 102 provides an improvement in the video processing and display control technologies by enabling a smooth transition between different types of video segments while preserving the artistic intent in the frames. Further, the control of the visual properties by the video transition controller 206 of the electronic device 102 based on the detection of the transition results in synching of the visual appearance of the interstitial content items to the main video content, such as the TV program. Thus, even for the HDR or standard dynamic range (SDR) video formats, the change from main video content to the interstitial content items may be not be visually unpleasing to a viewer based on the operations of the video transition controller 206.

Various embodiments of the disclosure may provide a non-transitory computer readable medium and/or storage medium, and/or a non-transitory machine readable medium and/or storage medium having stored thereon, a machine code and/or a set of instructions executable by a machine, such as the electronic device 102, and/or a computer. The set of instructions in the electronic device 102 may cause the machine and/or computer to perform the operations that comprise detection, from a sequence of image frames received from a video source, a transition from one or more frames associated with a first metadata to one or more other frames associated with a second metadata. First visual properties of the one or more frames may be determined based on the first metadata. Second visual properties of the one or more other frames may be determined based on the second metadata. The determined second visual properties of the one or more other frames may be controlled in accordance with the determined first visual properties of the one or more frames to enable a smooth transition. The operations when performed may enhance the functioning of the electronic device 102 or the computer itself.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A video processing device, comprising:
at least one circuit configured to:
  receive a sequence of image frames from a video source;
  detect a flag value in said sequence of image frames, wherein
    said sequence of image frames includes a first set of frames and a second set of frames,
    said first set of frames includes a first frame,
    said second set of frames includes a second frame, a third frame subsequent to said second frame, and a fourth frame subsequent to said third frame, and
    said flag value represents a discontinuity between said first frame and said second frame;
  detect, based on said flag value, a transition from said first frame associated with first metadata to said second frame associated with second metadata;
  determine a first brightness level of said first frame based on said first metadata;
  determine a second brightness level of each of said second frame, said third frame and said fourth frame based on said second metadata;
  determine a difference between said determined second brightness level of said second frame and said third frame is greater than a threshold value;
  increase said determined second brightness level of each of said second frame, said third frame, and said fourth frame by a specific brightness value, wherein
    said increased second brightness level of each of said second frame, said third frame, and said fourth frame is greater than said first brightness level of said first frame, and
    said increase in the determined second brightness level is based on said determined difference that is greater than said threshold value;
  determine a difference between said determined second brightness level of said third frame and said fourth frame is less than said threshold value; and
  terminate said increase of said determined second brightness level after said fourth frame based on said difference, between said determined second brightness level of said third frame and said fourth frame, that is less than said threshold value.

2. The video processing device according to claim 1, wherein said sequence of image frames comprises a first type of video segment that corresponds to said first frame and a second type of video segment that corresponds to said second frame.

3. The video processing device according to claim 2, wherein said first type of video segment and said second type of video segment are a high dynamic range (HDR) video.

4. The video processing device according to claim 2, wherein said first type of video segment corresponds to at least one of a television program, a video item from an Internet-based video streaming application, or a video item from a subscribed service.

5. The video processing device according to claim 2, wherein said second type of video segment corresponds to at least one of an interstitial content, a commercial, a trailer, or a segment of video content that serves as an attraction for viewership.

6. The video processing device according to claim 1, wherein said first metadata and said second metadata comprises at least one of average picture brightness information, maximum picture brightness information, or chroma information.

7. The video processing device according to claim 1, wherein said at least one circuit is further configured to determine said first brightness level and said second brightness level based on spatial image information of said sequence of image frames.

8. A method, comprising:
receiving, by at least one circuit, a sequence of image frames from a video source;
detecting, by said at least one circuit, a flag value in said sequence of image frames, wherein
said sequence of image frames includes a first set of frames and a second set of frames,
said first set of frames includes a first frame,
said second set of frames includes a second frame, a third frame subsequent to said second frame, and a fourth frame subsequent to said third frame, and
said flag value represents a discontinuity between said first frame and said second frame;
detecting, by said at least one circuit, a transition from said first frame associated with first metadata to said second frame associated with second metadata, wherein said transition is detected based on said flag value;
determining, by said at least one circuit, a first brightness level of said first frame based on said first metadata;
determining, by said at least one circuit, a second brightness level of each of said second frame, said third frame, and said fourth frame based on said second metadata;
determining, by said at least one circuit, a difference between said determined second brightness level of said second frame and said third frame is greater than a threshold value;
increasing, by said at least one circuit, said determined second brightness level of each of said second frame, said third frame, and said fourth frame by a specific brightness value, wherein
said increased second brightness level of each of said second frame, said third frame, and said fourth frame is greater than said first brightness level of said first frame, and
said increase in the determined second brightness level is based on said determined difference that is greater than said threshold value;
determining, by said at least one circuit, a difference between said determined second brightness level of said third frame and said fourth frame is less than said threshold value; and
terminating, by said at least one circuit, said increase of said determined second brightness level after said fourth frame based on said difference, between said determined second brightness level of said third frame and said fourth frame, that is less than said threshold value.

9. The method according to claim 8, wherein said sequence of image frames comprises a first type of video segment that corresponds to said first frame and a second type of video segment that corresponds to said second frame.

10. The method according to claim 9, wherein said first type of video segment and said second type of video segment are a high dynamic range (HDR) video.

11. The method according to claim 9, wherein said first type of video segment corresponds to at least one of a television program, a video item from an Internet-based video streaming application, or a video item from a subscribed service.

12. The method according to claim 9, wherein said second type of video segment corresponds to at least one of an interstitial content, a commercial, a trailer, or a segment of video content serving as an attraction for viewership.

13. The method according to claim 8, wherein said first metadata and said second metadata comprises at least one of average picture brightness information, maximum picture brightness information, or chroma information.

14. The method according to claim 8, further comprising determining said first brightness level and said second brightness level based on spatial image information of said sequence of image frames.

* * * * *